United States Patent [19]

Mertens et al.

[11] Patent Number: 5,567,297

[45] Date of Patent: Oct. 22, 1996

[54] PROCESS FOR DEPOSITING BY ELECTROPOLYMERIZATION ON ORGANIC FILM ONTO AN ELECTRICALLY CONDUCTIVE SURFACE

[75] Inventors: Marc Mertens, Spa; Cedric Calberg, Liège; Lucien Martinot, Olne; Robert Jerome, Tilff; Jean Schrijnemackers, Embourg, all of Belgium

[73] Assignee: Recherche et Developement du Groupe Cockerill Sambre en abrégé: "RD-CS", Ougrée, Belgium

[21] Appl. No.: 374,431

[22] Filed: Jan. 19, 1995

[30] Foreign Application Priority Data

Jan. 20, 1994 [BE] Belgium ............................... 09400067

[51] Int. Cl.$^6$ .............................. C25B 3/00; C25D 11/00
[52] U.S. Cl. ........................ 205/334; 205/414; 205/422; 205/317
[58] Field of Search ..................... 204/59 R, 72, 204/73 R; 205/317, 318, 320; 106/14.05

[56] References Cited

U.S. PATENT DOCUMENTS 3,759,797  9/1973  Masunaga et al. ................. 204/59 R
4,566,955  1/1986  Naarmann ........................ 204/59 R

FOREIGN PATENT DOCUMENTS 38244    4/1981  European Pat. Off. .
0038244  10/1981  European Pat. Off. .
0323351   7/1989  European Pat. Off. .

OTHER PUBLICATIONS

Derwent Publications Ltd., Week 8632, London, GB, AN 86-209496 Jun. 30, 1986.

*Primary Examiner*—Kathryn Gorgos
*Assistant Examiner*—Edna Wong
*Attorney, Agent, or Firm*—Browdy and Neimark

[57] ABSTRACT

A process for depositing by electropolymerization an organic film onto an electrically conductive surface, wherein use is made of a mixture comprising (a) at least one monomer suited for forming a polymer onto said surface, (b) at least one material which can be linked to said polymer, (c) a supporting electrolyte and (d) a solvent, said process comprising the use, as material to be linked to said polymer, of a reactive substance which can react chemically with the growing polymeric chains formed starting from the monomer.

25 Claims, 6 Drawing Sheets

PROCESS FOR DEPOSITING BY ELECTROPOLYMERIZATION ON ORGANIC FILM ONTO AN ELECTRICALLY CONDUCTIVE SURFACE

The present invention relates to a process for depositing by electropolymerization an organic film onto an electrically conductive surface, wherein use is made of a mixture comprising:

(a) at least one monomer suited for forming a polymer, preferably a non-conductive polymer, on said surface,
(b) at least one material which can be linked to said polymer,
(c) a supporting electrolyte, and
(d) a solvent, said mixture being subjected to electrolysis wherein said conductive surface to be coated is used as cathode at a potential situated in the range corresponding to electron transfer between the conductive surface and the monomer of a value equal to, near or more negative than the value corresponding to the inhibition peak of the cathodic reaction of the monomer, but less negative than the reaction of the solvent or of the supporting electrolyte.

The production of metal surfaces coated with an organic film is of high interest in many fields, in particular for the manufacture of prosthetics or as part of anticorrosion protection. This type of application requires the synthesis of a stable composite material, the metal-polymer interface of which is sufficiently resistant to meet multiple stresses. In metallurgy for example, the actual protection and activation processes of surfaces which are based on the deposition of Co or Cr, either electrochemically or not, do no longer answer for a medium long period the requirements of the future legislations as to the pollution degree of the effluents.

In certain particular application fields, with a very high added value, many researches have as object to obtain bidimensional objects such as thin layers, the properties of which are magnified with respect to the properties of traditionally synthetized massive compounds. Like thin organic layers, the organization of polymeric chains permits to develop cooperative effects between the individual properties of the constituent units thereof. The structural properties resulting from this organization, i.e.: order and interactivity between the molecular units, orientation and configuration of the polymeric chains may be turned to account.

The modification of metal surfaces, or of any other electrically conductive surface, by coating with a thin organic layer is interesting in many application fields, such as in optoelectronics, micromechanics, electronics and biotechnologies. Here also, the structural order is a requirement in view of obtaining high quality materials.

But, whatever may be the use of the material, achieving a stable metal-polymer interface is necessary. The excitement which prevails in this field of research, both in the scientific as in the industrial world, reflects the urgency of a convincing and generalizable solution.

Various approaches have been proposed for depositing an organic film onto metal surfaces having satisfying properties especially as regards adherence, porosity and homogeneity. In the past, the use of a silicium containing intermediate has partially solved the problem, this latter solution having however no particular impact into the industrial world. More recently, it has been proposed to form bonds between the atoms of a metal and of the heteroatoms of an organic molecule in order to assure the adhesion of a film of these molecules onto the previously activated metal surface.

Parallel to these researches, many works have studied the possibilities offered by the electrochemical way. They have shown that while there are many monomers which can polymerize by electron transfer on the cathode, the number of these monomers able to produce a film adhering to the surface to be coated is much more restricted. So it appears that only acrylonitrile, methacrylonitrile and parachlorostyrene show the desired characteristics. Recently, it has been shown that the polyacrylonitrile chains which are in immediate contact with the electrode have a certain orientation and tacticity due to an interaction between the dipole of the monomer and the electric field. This organisation disappeared rapidly upon growth of the film.

It is also known to add to said mixture, as material which can be linked to the polymer, a dopant. The introduction of the dopant into the film is done through an electrochemical reaction which may disturb the reaction of the monomer onto the electrically conductive surface with the risk of reducing in particular the coverage degree of the polymer and the adhesion of this polymer onto the surface to be coated. Moreover, the dopant is preferentially incorporated in the immediate vicinity of the electrode, so that it has practically no effect onto the surface properties of the film. A too high incorporation degree is a cause of film enbrittlement due to the energetically weak physical interactions which unite the dopant and the polymer in the composite film.

At present, it is still not possible to deposit for example a film of a biocompatible character, which is a conditio sine qua non for the use of such a film as coating of prosthetics or for covering a metal surface with an organic layer presenting a functionality desired in the field of paints or varnishes, i.e.: amine, acid, ester or epoxyde for example in order to assure through chemical bonds a strong adherence between the polymeric film and the finishing layer.

One of the objects of the present invention is to propose a process which permits to go beyond the current vary narrow limits of the electrochemical processes by forming through electropolymerization thin organic films showing very satisfying properties in terms of surface coverage degree, homogeneity and adherence of the film and the mechanical, structural and surface properties of which are adjustable within very wide limits in function of the user's needs. According to the invention, use is thus made as material to be linked to the polymer of a reactive substance(s) which can chemically react with the growing polymeric chains formed starting from the monomer.

The substance in question is more particularly a reactive substance comprising one or several molecules which are able to be chemically inserted into the growing polymeric chains formed starting from said monomer.

Advantageously, this molecule is constituted of a comonomer which can copolymerize with said monomer.

By integrating itself by copolymerization into the chains formed from the monomer, the monomer can, without inhibiting the propagation mechanism, modify the properties thereof in a more or less considerable way according to the incorporation degree which is itself dependent in particular of the respective concentrations of the monomer and the comonomer which may thus be chosen in function of the desired result.

Moreover, in another embodiment of the invention, said substance is formed by a terminator agent which can stop the propagation process of the polymerization. In this case, by stopping thus the propagation process, the deposits forming the film in question can be limited to small thicknesses while increasing the density of the chains promoted by electropolymerization. The higher the concentration of the terminator agent, the shorter the polymeric chains in the film and the larger the number thereof. By using a terminator agent, the coverage degree of the conductive surface, i.e. the cathode, onto which the film has to be formed, can thus be increased. A priori, an increased density of the promoted chains means also a better spatial organisation thereof. Moreover, a judicious choice of the terminator agent allows to introduce according to the invention a particular requested functionality on the surface of the electrodeposited film.

From the above it results thus that the invention concerns the formation of any type of organic film deposited by cathodic electropolymerization onto an electrically conductive surface, most of the polymeric chains of which are present in the form of a succession with a variable length of monomeric units terminated by a different unit in the case wherein the reactive substance is a terminator agent. If the reactive substance introduced into the mixture to be subjected to an electropolymerization contains a comonomer, the organic films deposited by cathodic electropolymerization are, in most of the cases, formed by polymeric chains containing any succession of two units: the monomer and the comonomer. Thus, the extreme case is the formation of a film, most of the chains of which are present in the form of a more or less large succession of comonomeric units but the extremity of which, which is the closest to the surface to be coated, is formed by a monomeric unit.

In certain cases, it is possible according to the invention to make use of a reactive substance comprising both a comonomer and a terminator agent, the ratio of which may vary within large limits in function of the intended purpose.

Moreover, in addition to said comonomer and/or said terminator agent, the mixture destined to be subjected to electrolysis may advantageously contain one or more other electrochemically inert or active materials; forming for example dopants.

The electrochemically reactive dopants may be in the form of soluble inorganic or organic compounds, or further in the form of complexes. As inorganic compounds mention can be made of : $TiCl_4$, $CuBr_2$, $Fe(Ac)_2$, $NiBr_2(P\Phi_3)_2$, $AgNO_3$, $AlCl_3$, $FeCl_3$, $MoCl_3$, $MoCl_5$, $MnBr_2$, $CrCl_3$, $WCl_6$, $VCl_3$, $MgCl_2$, $PbCl_2$, $MoBr_3$, $MoBr_4$, $TiCl_3$, $Cs_2UCl_6$, $Cs_2UO_2Cl_4$, $Cs_2NpCl_6$, $Cs_2PuCl_6$. As organic compounds, mention can be made of amides and quinones and as complex compounds, ferrocene and carbonyl metals. It is important to notice that said electrochemically reactive dopants may not be mistaken for the dopants which are frequently used in the broad field of conductive polymers wherein the dopants consist in counterions of the polymer which are indispensable to ensure the electroneutrality of the deposit in its conductive form.

The electrochemically inert dopants, or which are considered to be inert since they do not react within the claimed cathodic potential range, may be in the form of organic or inorganic compounds. As inorganic compounds, mention can be made of: oxydes such as $TiO_2$, $MgO$, $Al_2O_3$, $SiO_2$, $Fe_2O_3$; insoluble salts such as $CaCO_3$, $MgCO_3$, $Ca(NO_3)_2$, $NaCl$, $PbSO_4$, $CaSO_4$, $FeSO_4$ . . . As organic compounds, mention can be made of oligomers or polymers containing no reduceable functional group of the alcohol, acid, quinone type.

Moreover, according to the invention the used solvent may be either an aprotic compound, a combination of monomer-molecule to be inserted chemically into the polymeric chains, or further a combination of the three. In principle, it is sufficient that the solvent does not produce a parasitic reaction with the monomer, nor with said molecule.

More particularly, the process according to the invention, when it is intended to produce a composite film onto usual metals which are susceptible to anodic dissolution in an organic medium, is generally better adapted to produce polymeric films under cathodic working conditions. In this respect, use is preferably made according to the invention of a monomer which is a precursor of a non-conductive polymer.

As aprotic solvent, mention can especially be made of hexamethylphosphorotriamide, dimethylsulfoxide, dimethylformamide, acetonitrile and/or methylene chloride.

Concerning the electrolyte, this electrolyte has to be soluble into the chosen solvent and its concentration has to be sufficient to obtain a sufficiently high conductivity in the electrolysis cell wherein said mixture is introduced to perform the deposition by electropolymerization. In this way, it has appeared that this conductivity may generally be equal to or higher than $10^{-4}\Omega^{-1}cm^{-1}$. Good results have been obtained with a concentration situated between $10^{-3}$ and 5M, whilst preference is given to concentrations comprised between $5\times10^{-2}M$ and $5\times10^{-1}M$. More particularly, the supporting electrolyte may comprise according to the invention a perchlorate, a tosylate, a tetrafluoroborate, a hexafluorophosphate and/or a quaternary ammonium halide of formula:

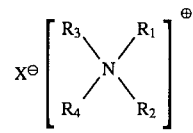

wherein $X^-$ represents $ClO_4^-$, $BF_4^-$, $PF_6^-$, $OTos^-$, $Cl^-$, $Br^-$ and wherein the $R_1$, $R_2$, $R_3$ et $R_4$ radicals, which may be identical or different, are hydrogens, $C_1$ to $C_6$ alkyl or aryl radicals.

Concerning the monomer, its concentration in the electrolysis bath has to be sufficient to obtain the required homogeneity and adhesion. This concentration is generally maintained between $10^{-3}$ and 10M. Preference is given to a monomeric concentration comprised between $5\times10^{-2}M$ and 2M except in the case wherein the monomer forms the solvent in combination with the molecule to be inserted chemically into the polymeric chains. This monomer may for example be of the unsaturated or cyclic type. More particularly, it may show an inhibition peak onto a voltamperogram achieved at a low potential scanning speed of for example 5 mV per second. More specifically, the monomer may be formed of acrylonitrile, acroleine and/or acrylamide.

The choice of the nature of the reactive substance to be inserted in or to be fixed onto the growing polymeric chains by chemical reaction is principally dependent on the propagation mechanism thereof, but also on the properties which one wishes to give to the film. DPPH (2,2-diphenyl-1-picrylhydrazyl), halogenated derivatives and mercaptans are examples of terminator agents for a radical propagation. As regards the comonomer, the process according to the invention requires that it is polymerized by the same type of active species than the monomer, for example a radical species. The comonomer may be a vinyl monomer and, preferably an acrylate, and/or a methacrylate.

Advantageously, care should be taken to avoid the use of a terminator agent or a comonomer which are reduced at a potential less negative than the potential of the inhibition peak of the monomer. On the contrary, if this chemical entity is susceptible to react on the anode, the electropolymerization device will comprise preferably a fritted glass sheet to separate the anode and cathode compartments in order to ameliorate the purity of the obtained films.

The maximum concentration of said reactive substance in the mixture to be subjected to electropolymerization is determined by its solubility limit in the electrolysis bath. More specifically, if this substance is a terminator agent, its concentration is generally lower than the monomer concentration, except if extremely thin films are desired, for example of some tens of Angstroms, or films having a high surface functionalization degree. Preference is given to concentrations situated between $10^{-6}$ and $10^{-1}$M. If this substance is a comonomer, its concentration is generally equivalent or higher than the monomer concentration. Preference is given to concentrations situated between $5.10^{-3}$ and 5M, except if the solvent is a monomer-comonomer combination.

As already indicated hereinabove, the reactive substance may be of a very various nature. In case the propagation mechanism is a radical mechanism, three types of terminator agents can be distinguished: (a) terminator agents which react by coupling and which are formed of stabilized radicals such as DPPH; (b) those which react by transfer, such as mercaptans or halogenated derivatives; and finally (c) captodative monomers which, after reaction with the reactive species, are unable to continue the polymerization due to the production of a too stabilized radical. In this last category, mention can be made as example of monomers having the following general formula:

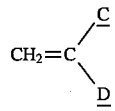

wherein C is an electronegative group, such as for example —C≡N, —CO—R, —CO—OR and wherein D is an electropositive group, such as for example —OR, —NR$_2$, —SR, —O—CO—R, —O—SiR$_3$, —O—PO—(OR)$_3$.

As stabilized radical, mention can be made i.a. of 1,3-bis-diphenylene-2-phenylallyl or 2,2-di(4-tert-octylphenyl)-1-picrylhydrazyl.

As terminator agent reacting by transfer, use can for example be made of:

polyhalomethanes of formula CH$_a$X$_b$Y$_c$ wherein X et Y represent Cl$^-$, Br$^-$, F$^-$ or I$^-$ and wherein a varies from 0 to 2 and b and c from 0 to 4 disulphides of formula (R—S)$_2$ such as (C$_2$H$_5$—S)$_2$, (C$_6$H$_5$—CH$_2$—S)$_2$, (C$_6$H$_5$—CO—S)$_2$ . . .

azobisisobutyronitrile (AIBN) or one of its derivatives of formula

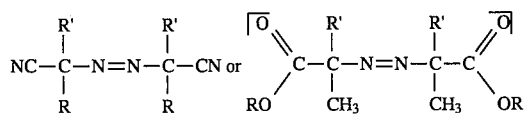

wherein R and R' which may be identical or different, are C$_1$ to C$_6$ hydrocarbon chains, a peroxide of type

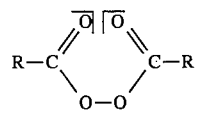

a mercaptan, such as for example CH$_3$—CH$_2$—CH$_2$—SH, CH$_3$—COCH$_2$-SH, CH$_3$—O—CO—CH$_2$—CH$_2$—SH.

As already indicated hereinabove, also the nature of the comonomer may be very diversified. Mention can be made by way of non-limitative examples of:

olefins, vinyl halogenides (for example CH$_2$=CHCl), vinylidene halogenides (for ex. CH$_2$=CBr$_2$, C$_2$=CCl$_2$), acrylates, methacrylates, vinyl esters, vinyl ethers, aromatic vinyls, conjugated dienes, lactones.

The final selection takes both the mechanical properties and the required functionality into account. Some applications are set forth hereinafter:

The resistance to mineral acids and bases can be ameliorated by the incorporation of fluoronated monomers, for example tetrafluoroethylene CF$_2$=CF$_2$, fluoroethylpropylene, perfluorated vinylether or fluorated (meth)acrylate.

The copolymerization of allylmethacrylate (CH$_2$=C(CH$_3$3)—COOCH$_2$—CH=CH$_2$) in view of forming a film cross-linkable by simple UV irradiation.

The copolymerization of glycidylmethacrylate

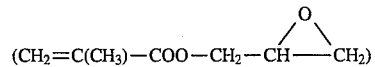

in view of forming films carrying reacting epoxide groups.

The copolymerization of a little polar monomer, such as butadiene or an n-alkyl acrylate, to ameliorate the impact resistance of the films.

The copolymerization of a masked form of hydroxyethylmethacrylate to increase the biocompatibility of the films.

According to a particular embodiment of the invention, use is made of a comonomer which also shows an inhibition peak onto a voltamperogram achieved at a low potential scanning speed.

As already pointed out hereinabove, it is possible to use in function of the nature of the electrolysis bath the electrically conductive surface as cathode. This surface may for example be a metal surface or a surface formed from graphite or may further be an ITO electrode.

According to the invention, the electrolysis is achieved by polarizing the cathode at a potential situated within the range corresponding to electron transfer between the considered electrode and the monomer, but less negative than the potential of the reaction of the solvent or the supporting electrolyte, optionally less negative than the potential of the molecule to be chemically inserted, so as to limit the degrading action of these reactions onto the homogeneity of the polymeric layer. The value of the electrolysis potential depends of course on the nature of the solvent, the monomer, the molecule to be inserted and of their respective concentration. This value is determined after analysis of the electrochemical graphs obtained by voltamperometry. In practice, the range of potentials compatible with the process according to the invention comprises all of the potentials comprised between the start of the inhibition peak and the end of the passivation zone resulting therefrom. The potentials at which monomer and molecule to be chemically inserted are subjected to a concomitant reduction are preferably eliminated from the selected zone.

In the particular case wherein monomer and comonomer show an inhibition peak, the range of potentials compatible with the process extends from the start of the least cathodic inhibition peak to the potential corresponding to the reaction of the solvent or the supporting electrolyte.

By performing the electrolysis starting from a very pure solution, under controled atmosphere, any possibility for developing parasitic reactions which may have a negative effect onto the homogeneity of the films are strongly reduced.

The use of an electrolysis solution wherein the water and oxygen contents are maintained at a very low level, permits to produce thin organic films onto the surfaces to be coated, showing satisfying properties as to the surface coverage degree, their adherence and their homogeneity. Preferably, the water content of the bath is lower than $10^{-3}$M. Prior to the electrolysis, the electrolysis bath is degased by aggregative fluidization with an inert gas containing maximum 5 ppm $H_2O$ and 10 ppm $O_2$.

Other characteristics and advantages of the invention will become apparent from the description given hereinafter, with reference to the annexed drawings, of some examples for applying the process of the invention and which are of course given only by way of non-limitative example.

Figure 7:
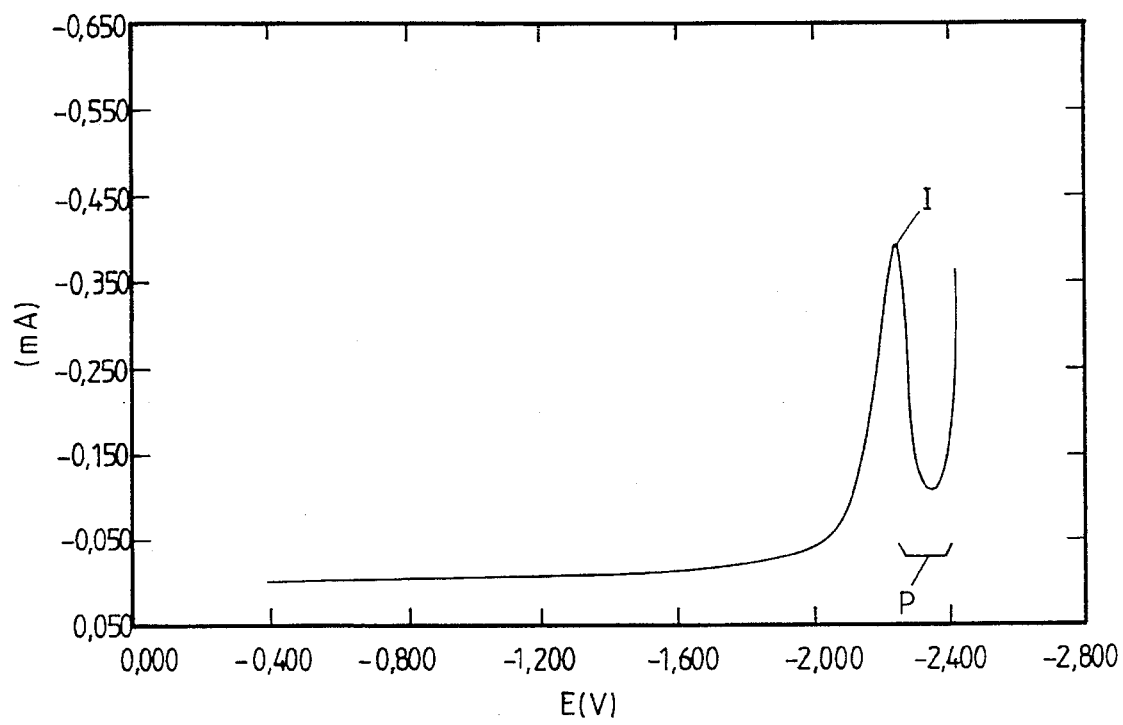
Figure 8:
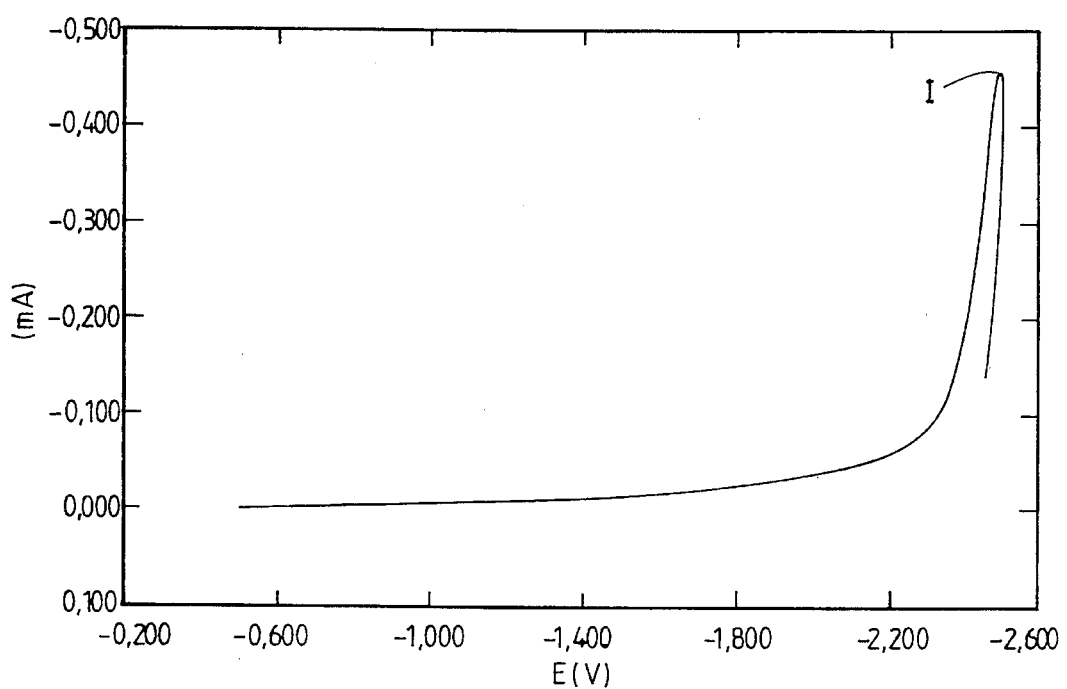

FIGS. 7 and 8 each show a voltamperogram relating to the use of DPPH as terminator agent.

In the different figures, the same reference numerals relate to the same elements.

Figure 1:
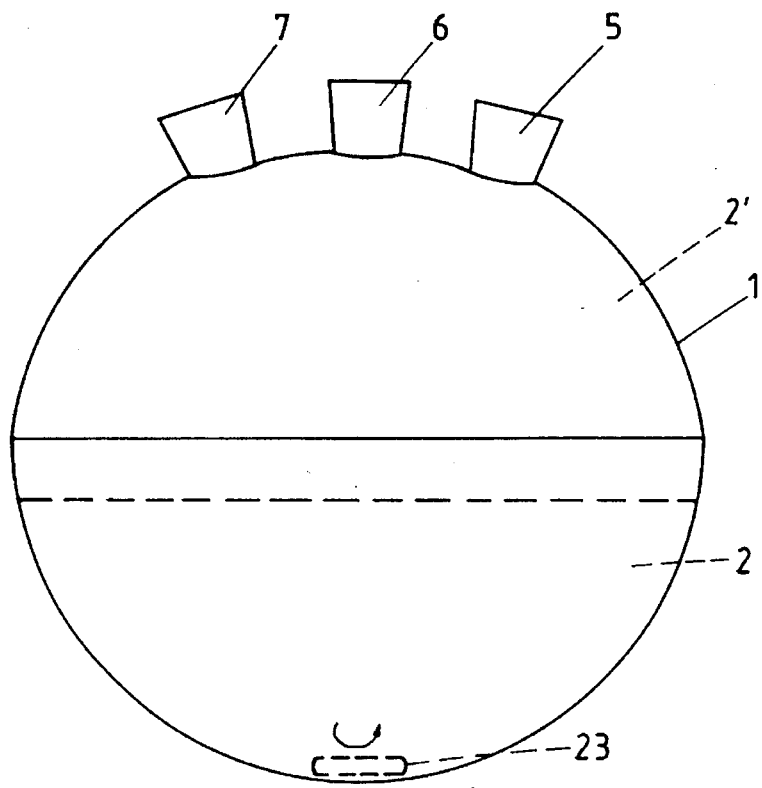
FIG. 1 is a schematic elevational view of an electrochemical cell permitting to apply the process according to the invention and wherein the electrodes have been omitted.
Figure 2:
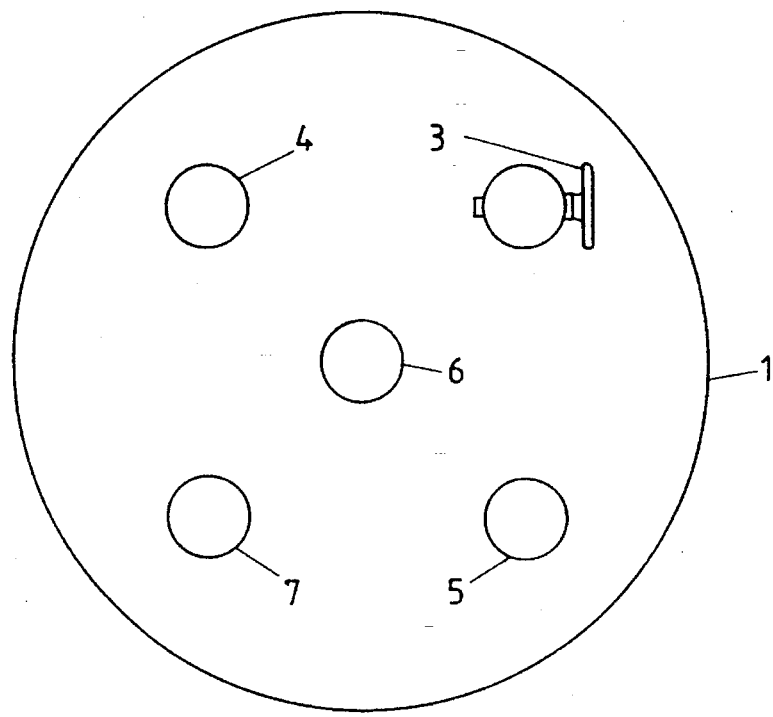
FIG. 2 is a top plan view of the same cell.

The electrolysis cell as shown in FIGS. 1 and 2 comprises a closed chamber 1 containing a solution 2 composed of solvent, monomer, supporting electrolyte and reactive substance which can be inserted by chemical reaction. On the bottom of this chamber 1 is provided a magnetic bar 23 revolving around a vertical axis to homogenize the solution 2.

The upper portion of this chamber comprises a cock 3, permitting to maintain above the solution 2 an inert nitrogen atmosphere 2', and four conical internally ground in holes 4, 5, 6 and 7 wherein electrodes are suspended, in particular a central working electrode 8, two counter electrodes 9 and 10 situated on both sides of the working electrode 8 and a reference electrode 11.

Figure 3:
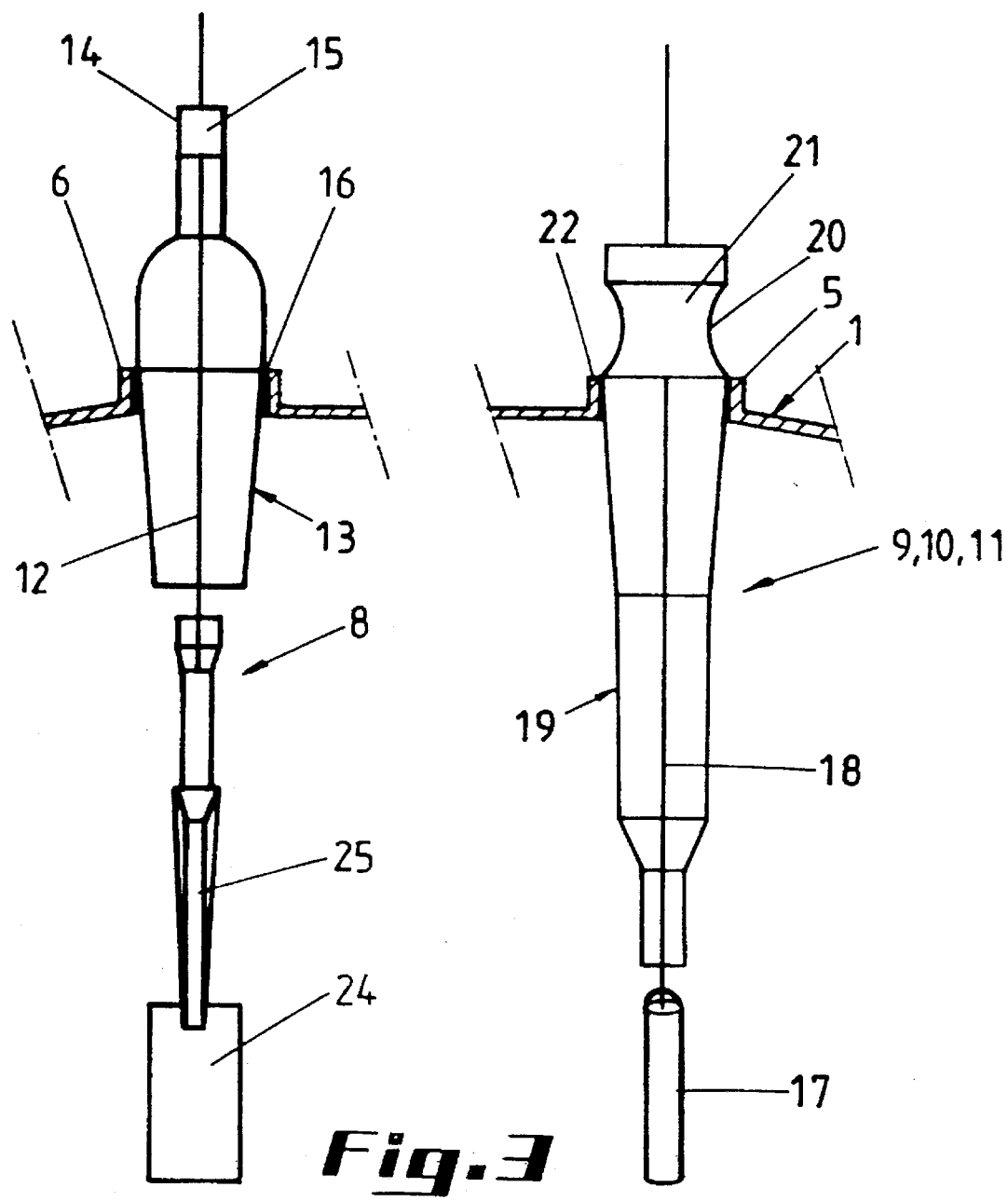
FIG. 3 is a partial vertical section, on a larger scale, of the two electrodes fitted into the cell according to the previous figures.

These electrodes have been shown more into detail in FIG. 3. The working electrode 8 comprises on its lower free end a metal sheet 24 to be coated and having for example a width of 1 cm and a height of 2 cm. This sheet 24 is suspended by means of pincers 25 to a conductor 12 extending within a glass sleeve 13, on the axis thereof, the upper opening 14 of which is closed off by an epoxy glue stopper 15. The sleeve 13 has a ground in conical outer wall 16 fitting in a substantially tight way into the hole 6 of chamber 1.

The reference electrode 11 and the counter electrodes 9 and 10 are of the same construction and comprise a platinum sheet rolled up in the form of a cylinder 17 with a surface in the range of 10 cm². This cylinder 17 is suspended from a conductor 18 extending on the axis of a glass sleeve 19 closed on its upper end 20 by an epoxy glue stopper 21.

Just as for the electrode 8, the electrodes 11, 9 and 10 have a conical outer wall 22 fitting in a tight way in the corresponding holes 7, 4 and 5 of the chamber 1.

Figure 4:
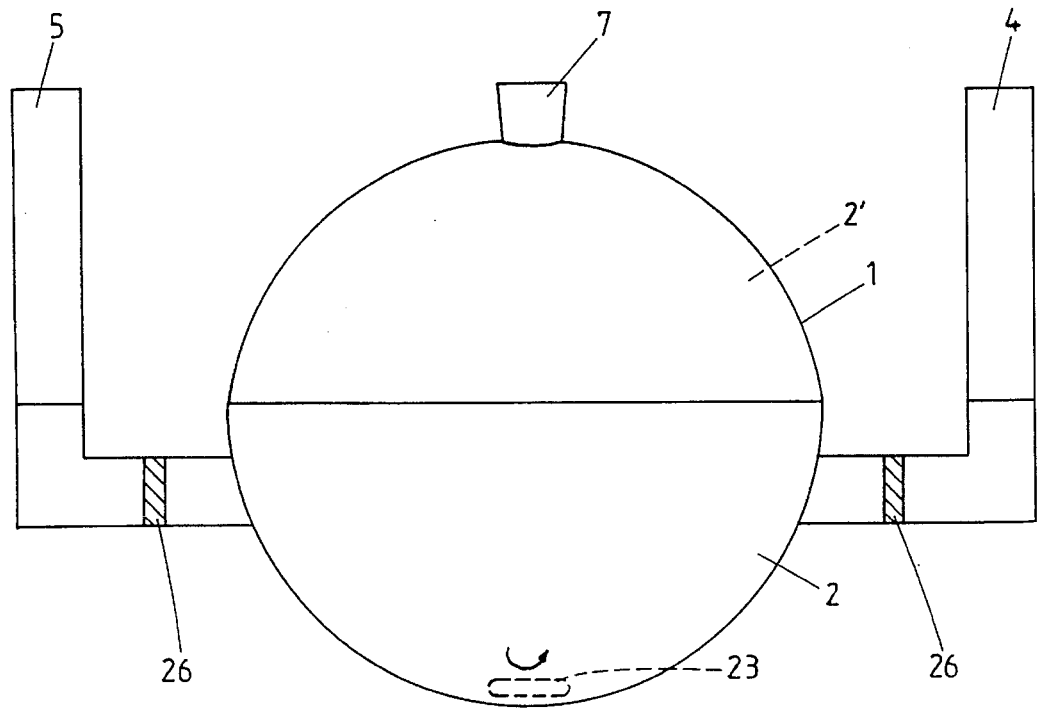
FIG. 4 is a schematic elevational view of a cell according to a variant of the embodiment according to the previous figures.
Figure 5:
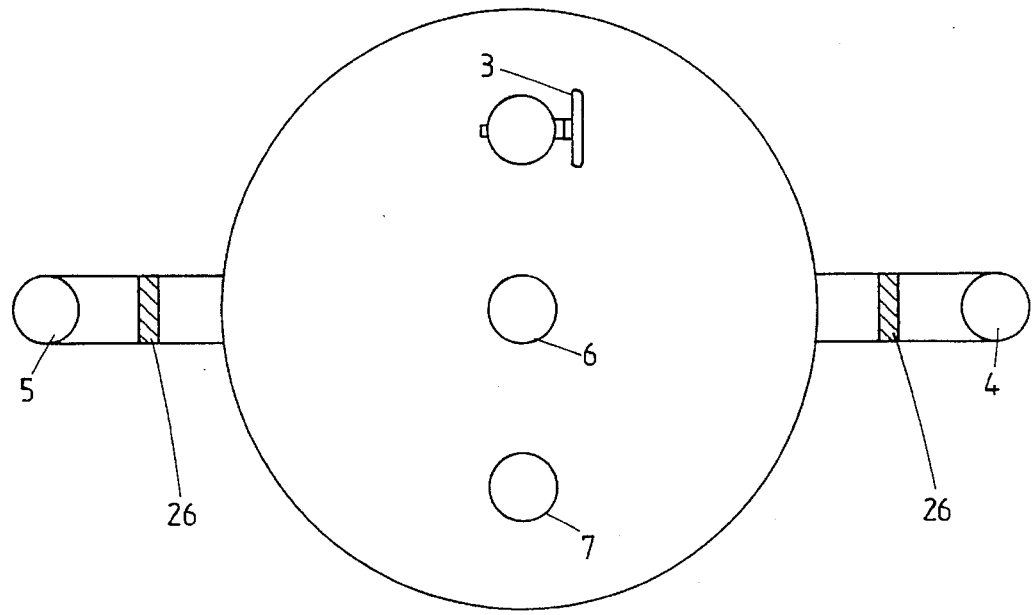
FIG. 5 is a top plan view of this variant embodiment.

The variant embodiment illustrated in FIGS. 4 and 5 differs from the embodiment shown in the previous figures by the fact that the anode and cathode compartments are separated by a fritted glass sheet 26.

EXAMPLE 1

This example demonstrates the incorporation of deuterium containing styrene into an acrylonitrile film. The reactive substance, in particular the molecule to be inserted by chemical reaction into the growing polymeric chains is here a comonomer. The electrode is from nickel and the solvent is formed of acetonitrile.

The electrolysis bath has been prepared on the basis of the following constituents:

30 ml of $CH_3CN$ (Janssen, P. A.) dried for 48 hours on calcium hydride ($CaCH_2$).

0.35 g of $Et_4NClO_4$ (Fluka, >99%) dried for 24 hours under vacuum (P=$10^{-2}$ mb) at 80° C.

0.2 ml of $CH_2$=CH—C≡N (Aldrich, 99%) dried for 48 hours on $CaH_2$.

1.75 g of $C_8D_8$, dried on fluorenyl lithium.

Figure 6:
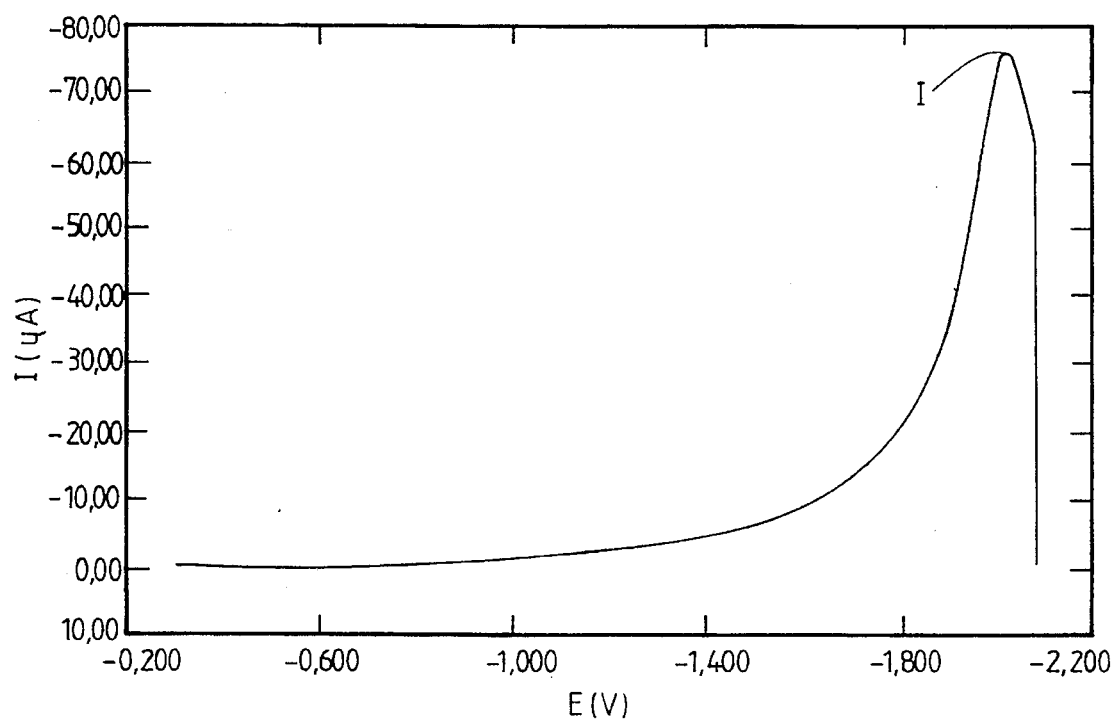
FIG. 6 shows a voltamperogram relating to the electrolysis with deuterium containing styrene.

The sample has been obtained by cyclic voltamperometry at a small scanning speed (5 mV/s) (FIG. 6). The final electrolysis potential is −2 V with respect to a platinum pseudoelectrode immersed in the electrolysis bath. This potential is slightly higher than the potential of the top of the inhibition peak of acrylonitrile, but lower than the first reduction potential of styrene under similar experimental conditions.

The mass spectroscopy analysis of secondary ions shows clearly the presence of deuterium cores in the polymeric film.

EXAMPLE 2

This example relates to the use of DPPH as terminator agent. The monomer is here acrylonitrile and the solvent acetonitrile.

The electrolysis baths have been prepared on the basis of the following constituents:

150 ml of $CH_3CN$ (Janssen, P. A.) dried for 48 hours on calcium hydride ($CaCH_2$).

1.9 g of $Et_4NClO_4$ (Fluka, >99%) dried for 24 hours under vacuum (P=$10^{-2}$ mb) at 80° C.

$CH_2$=CH—C≡N (Aldrich, 99%) dried for 48 hours on $CaH_2$.

2,2-Di(4-tert-octylphenyl)-1-picrylhydrazyl of formula $C_{34}H_{44}N_5O_6$ (Janssen, >98%) dried for 1 week under vaccum (P=$10^{-2}$ mb).

| | | Results | |
|---|---|---|---|
| Test | [DPPH] | [Acrylonitrile] | Observations (voltamperogram at 20 mV/s) |
| 1 | 0 | 0.1M | Inhibition peak current: 400 μA |
| 2 | 3.10⁻⁵M | 0.1M | Inhibition peak current: 460 μA with decoloration |
| 3 | 0 | 0.3M | Inhibition peak current: 68 μA |
| 4 | 3.10⁻⁵M | 0.3M | Inhibition peak current: 76 μA with decoloration |
| 5 | 0 | 0.2M | Inhibition peak current: 78 μA |
| 6 | 3.10⁻⁴M | 0.2M | Inhibition peak current : 410 μA |
| 7 | 10⁻³M | 0.2M | Inhibition peak current: 680 μA |

With respect to a platinum pseudo reference immersed in the electrolysis bath free of monomer, the decoloration of the DPPH does not take place before −2.6 V. In the presence of monomer, this decoloration is observed at a much weaker potential corresponding to the potential of the inhibition peak (tests 2 and 4). This means that DPPH reacts with the radical which assures the propagation. This fact has been confirmed by SIMS measurements, which certify the presence of DPPH molecules onto the film surface and the quasi absence of these molecules within the film. FIGS. 7 and 8 correspond respectively to tests 1 and 2.

An important increase of the current of the passivation peak is thus observed when the DPPH concentration is increased. This fact expresses the decrease of the size of the polymeric chains. In this case, the shielding effect is smaller and the amount of monomer which reacts at the cathode, and consequently the coverage degree of the electrode surface, is larger. The decrease of the size of the chains can be seen with the naked eye.

In FIGS. 6 to 8, the inhibition peak has been indicated with reference I, whilst in FIG. 7, the passivation zone has been indicated with reference P.

What is claimed is:

1. A process for depositing by electropolymerization an organic film onto an electrically conductive surface, wherein use is made of a mixture comprising:

(a) at least one monomer suited for forming a reconductive polymer on said surface, (b) at least one material which can be linked to said polymer, (c) a supporting electrolyte, and (d) a solvent, said mixture being subjected to electrolysis so as to create a cathodic reaction wherein said conductive surface to be coated is used as cathode at a potential situated in the range corresponding to electron transfer between the conductive surface and the monomer of a value equal to, near or more negative than the value corresponding to an inhibition peak of the cathodic reaction of the monomer, but less negative than a reaction of the solvent or of the supporting electrolyte, and said material to be linked to the polymer being a reactive substance which can chemically react with growing polymeric chains formed starting from the monomer.

2. The process as claimed in claim 1, wherein said reactive substance is a comonomer which can copolymerize with the monomer onto the surface to be coated.

3. The process as claimed in claim 2, wherein a copolymer formed from said monomer and said copolymer is such that said copolymer is polymerised by a same active species as the monomer.

4. The process as claimed in claim 2, wherein the comonomer is a vinyl monomer or a cyclic monomer, selected from the group consisting of a vinyl or vinylidene halide, an acrylate, a methacrylate, a vinyl ester, a vinyl ether, an aromatic vinyl, a conjugated diene, and a lactone.

5. The process as claimed in claim 4, wherein the comonomer has a concentration between $5 \times 10^{-3}$M and 5M provided the solvent is not a monomer-comonomer combination.

6. The process as claimed in claim 1, wherein the monomer is selected from the group consisting of unsaturated and cyclic monomers and mixtures thereof.

7. The process as claimed in claim 6, wherein the monomer is selected from the group consisting of acrylonitrile, acrolein, acrylamide, and mixtures thereof.

8. The process as claimed in claim 1, wherein the monomer shows an inhibition peak on a voltamperogram achieved at a low potential scanning speed comprised between 2 and 10 mV per second.

9. The process as claimed in claim 1, wherein said monomer is used in concentrations between $10^{-3}$ and 10M in said mixture.

10. The process as claimed in claim 9, wherein the concentration of the monomer in said mixture is between $5 \times 10^{-2}$M and 2M in the case wherein the monomer is different from the solvent.

11. The process as claimed in claim 1, wherein said material which can be linked to said polymer comprises a terminator agent which can stop the polymerization process of the monomer onto said surface.

12. The process as claimed in claim 11, wherein said terminator agent reacts either by coupling, by transfer, or by interaction.

13. The process as claimed in claim 12, wherein the terminator agent reacting by interaction has the following general formula:

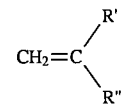

wherein R' is an electronegative group such as —C—N, —CO—R, —CO=OR, and wherein R" is an electropositive group selected from the group consisting of —OR, —NR$_2$, —SR, —O—CO—R, —O—SiR$_3$ and —O—PO—(OR)$_3$, R being C1 to C6 alkyl or aryl radicals.

14. The process as claimed in claim 12, wherein said stabilised radical is formed by 1,3-bis-diphenylene-2-phenylalkyl or 2,2-di (4-tert-octylphenyl)-1-picrylhydrazyl.

15. The process as claimed in claim 12, wherein said terminator agent reacting by transfer comprises:

polyhalomethanes of formula CH$_a$X$_b$Y$_c$ wherein X and Y represent Cl$^-$, Br$^-$, F$^-$ or I$^-$ and wherein a varies from 0 to 2 and b and c from 0 to 4 disulphides of formula (R-S)$_2$ tetraphenylethylene or one of its substituted derivatives azobisisobutyronitrile (AIBN) or one of its derivatives of formula:

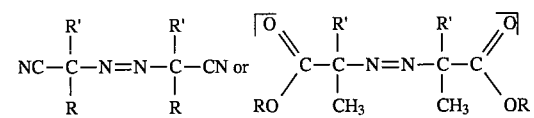

wherein R and R' which may be identical or different, are C$_1$ to C$_6$ hydrocarbon chains, a peroxide of type

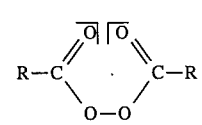

a mercaptan.

16. The process as claimed in claim 15 wherein said disulfides are selected from the group consisting of (C$_2$H$_5$—S)$_2$, (C$_6$H$_5$—CH$_2$—S)$_2$, and (C$_6$H$_5$—CO—S)$_2$.

17. The process as claimed in claim 15 wherein said substituted derivative of tetraphenylethylene is (CH$_3$)$_3$Si—O—C(C$_6$H$_5$)$_2$2—C(C$_6$H$_5$)$_2$—O—Si(CH$_3$)$_3$.

18. The process as claimed in claim 15 wherein said mercaptan is selected from the group consisting of $CH_3-CH_2-CH_2-SH$; $CH_3-COCH_2-SH$; and $CH_3-O-CO-CH_2-CH_2-SH$.

19. The process as claimed in claim 11, wherein said terminator agent is used in a concentration between $10^{-6}M$ and 1M.

20. The process as claimed in claim 1, wherein a dopant to be incorporated in said film during the polymerization is added to said mixture as said material which can be linked to said polymer.

21. The process as claimed in claim 1, wherein said supporting electrolyte is soluble in said solvent and shows a conductivity equal to or higher than $10^{-5}\Omega^{-1}cm^{-1}$.

22. The process as claimed in claim 1, wherein said supporting electrolyte is used in concentrations between $10^{-3}$ and 5M.

23. The process as claimed in claim 1, wherein said supporting electrolyte is selected from the group consisting of perchlorate, tosylate, tetrafluoroborate, hexafluoroborate, hexafluorophosphate a quanternary ammonium halide of formula:

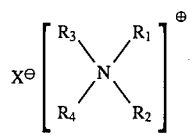

and mixtures thereof, wherein $X^-$ represents $ClO_4^-$, $BF_4^-$, $PF_6^-$, $OTos^-$, $Cl^-$, $Br^-$ and wherein the $R_1$, $R_2$, $R_3$ and $R_4$ radicals, which may be identical or different, are hydrogens, $C_1$ to $C_6$ alkyl or aryl radicals.

24. The process as claimed in claim 1, wherein said solvent is an aprotic, organic solvent.

25. The process as claimed in claim 24 wherein said aprotic, organic solvent is selected from the group consisting of hexa methylphosphorotriamide, dimethylsulfoxide, dimethylformamide, acetonitrile, methylene chloride, and mixtures thereof.

* * * * *